(12) United States Patent
Pfitzer et al.

(10) Patent No.: US 12,496,886 B2
(45) Date of Patent: Dec. 16, 2025

(54) FLOOR ASSEMBLY FOR A MOTOR VEHICLE, MOTOR VEHICLE AND METHOD FOR PRODUCING A FLOOR ASSEMBLY

(71) Applicant: Bayerische Motoren Werke Aktiengesellschaft, Munich (DE)

(72) Inventors: Hanno Pfitzer, Furth (DE); Rudolf Schilling, Ergolding (DE); Manuel Schurz, Landshut (DE); Jean-Marc Segaud, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 890 days.

(21) Appl. No.: 17/764,337

(22) PCT Filed: Oct. 20, 2020

(86) PCT No.: PCT/EP2020/079431
§ 371 (c)(1),
(2) Date: Mar. 28, 2022

(87) PCT Pub. No.: WO2021/083721
PCT Pub. Date: May 6, 2021

(65) Prior Publication Data
US 2022/0332181 A1 Oct. 20, 2022

(30) Foreign Application Priority Data
Oct. 28, 2019 (DE) ............. 10 2019 129 046.5

(51) Int. Cl.
*B60K 1/04* (2019.01)
*B62D 25/20* (2006.01)

(52) U.S. Cl.
CPC ............ *B60K 1/04* (2013.01); *B62D 25/2018* (2013.01); *B62D 25/2027* (2013.01); *B60K 2001/0438* (2013.01)

(58) Field of Classification Search
CPC .............. B60K 2001/0438; B60K 1/04; B62D 25/2017; B62D 25/2018
See application file for complete search history.

(56) References Cited

U.S. PATENT DOCUMENTS 9,789,908 B2 * 10/2017 Tsukada ............. B62D 25/2018
9,937,781 B1 * 4/2018 Bryer ..................... B62D 35/02
(Continued)

FOREIGN PATENT DOCUMENTS

| CN | 110053665 A | 7/2019 |
|---|---|---|
| DE | 10 2011 012 496 A1 | 8/2012 |

(Continued)

OTHER PUBLICATIONS

English translation of Chinese Office Action issued in Chinese Application No. 202080065675.8 dated Apr. 22, 2023 (7 pages).
(Continued)

*Primary Examiner* — Jeffrey J Restifo
(74) *Attorney, Agent, or Firm* — Crowell & Moring LLP

(57) ABSTRACT

A floor assembly for a motor vehicle has a front chassis module, in particular a front axle support, and a rear chassis module, in particular a rear axle support, as well as a housing of a stored electrical energy source, which is situated between the chassis modules as seen in the longitudinal direction of the floor assembly. The floor assembly includes at least one terminating component via which the housing of the stored electrical energy source can be fixed to a body part of the motor vehicle. The at least one terminating component is designed as a constituent part of at least one of the chassis modules. A motor vehicle includes such a floor assembly.

13 Claims, 3 Drawing Sheets

(56) References Cited

U.S. PATENT DOCUMENTS

| | | | |
|---|---|---|---|
| 10,160,492 | B2 | 12/2018 | Fees et al. |
| 10,476,051 | B2* | 11/2019 | Mardall ............... H01M 10/658 |
| 11,214,137 | B2* | 1/2022 | Stephens ................ B60L 50/66 |
| 11,299,205 | B2* | 4/2022 | Saje ........................ B62D 27/06 |
| 11,518,206 | B2* | 12/2022 | Harmon ............... B62D 63/025 |
| 11,688,910 | B2* | 6/2023 | Stephens ................ B60L 50/64 |
| | | | 429/96 |
| 11,702,162 | B2* | 7/2023 | Harmon ................. B62D 21/11 |
| | | | 296/193.04 |
| 11,866,095 | B2* | 1/2024 | Harmon ................. B62D 21/12 |
| 11,925,588 | B2* | 3/2024 | Wegner ................ A61G 3/0808 |
| 11,938,802 | B2* | 3/2024 | Harmon .................. B60K 1/00 |
| 12,065,029 | B2* | 8/2024 | Burja ..................... B62D 25/20 |
| 12,195,120 | B2* | 1/2025 | Harmon ................. B62D 21/03 |
| 2004/0060750 | A1 | 4/2004 | Chernoff et al. |
| 2004/0134699 | A1 | 7/2004 | Shimizu |
| 2008/0258506 | A1 | 10/2008 | Egawa et al. |
| 2014/0338999 | A1 | 11/2014 | Fujii et al. |
| 2018/0050607 | A1* | 2/2018 | Matecki ................. B60L 50/64 |
| 2018/0105209 | A1* | 4/2018 | Fees ..................... H01M 50/249 |
| 2018/0334022 | A1* | 11/2018 | Rawlinson ............. B60R 16/04 |
| 2018/0337374 | A1* | 11/2018 | Matecki .................. B60K 1/04 |
| 2019/0210470 | A1* | 7/2019 | Thomas ................. B62D 25/20 |
| 2021/0162849 | A1* | 6/2021 | Kerstan ................. B62D 21/15 |
| 2022/0332181 | A1* | 10/2022 | Pfitzer ................... B62D 25/20 |
| 2023/0373285 | A1* | 11/2023 | Volkmer ............. H01M 50/271 |
| 2024/0123807 | A1* | 4/2024 | Hausler ................. B62D 21/02 |
| 2024/0123808 | A1* | 4/2024 | Hausler ............... H01M 50/204 |
| 2024/0322347 | A1* | 9/2024 | Favaretto ............ H01M 50/213 |
| 2024/0343102 | A1* | 10/2024 | Birajdar .................. B60K 1/04 |
| 2025/0019021 | A1* | 1/2025 | Becirbasic .............. B60K 1/04 |

FOREIGN PATENT DOCUMENTS

| | | |
|---|---|---|
| DE | 10 2018 204 680 A1 | 10/2019 |
| EP | 2 070 754 A1 | 6/2009 |
| WO | WO 98/32622 A1 | 7/1998 |
| WO | WO 03/104009 A1 | 12/2003 |

OTHER PUBLICATIONS

English translation of Chinese-language Office Action issued in Chinese Application No. 202080065675.8 dated Sep. 6, 2023 (7 pages).

International Search Report (PCT/ISA/210) issued in PCT Application No. PCT/EP2020/079431 dated Jan. 20, 2021 with English translation (five (5) pages).

German-language Written Opinion (PCT/ISA/237) issued in PCT Application No. PCT/EP2020/079431 dated Jan. 20, 2021 (seven (7) pages).

German-language Search Report issued in German Application No. DE 10 2019 129 046.5 dated Aug. 18, 2020 with partial English translation (10 pages).

* cited by examiner

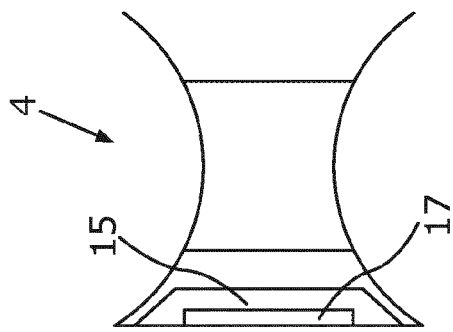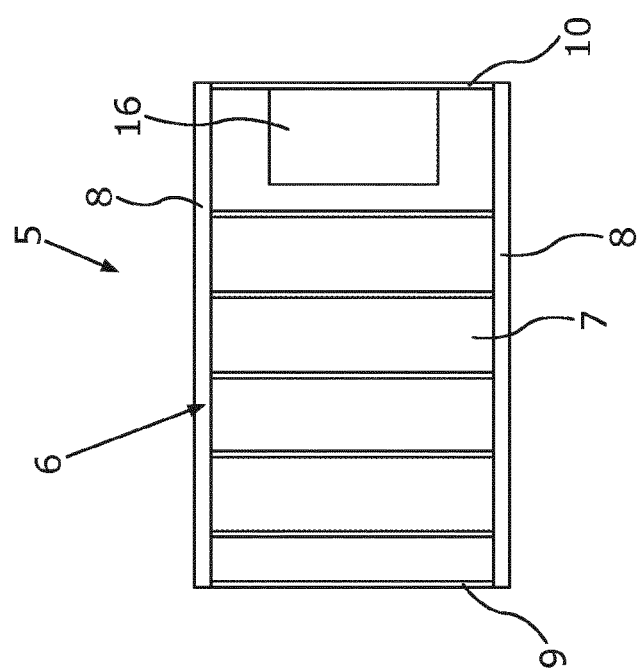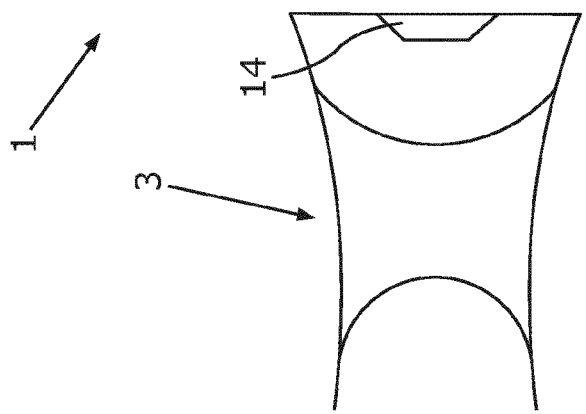
Fig.2

FLOOR ASSEMBLY FOR A MOTOR VEHICLE, MOTOR VEHICLE AND METHOD FOR PRODUCING A FLOOR ASSEMBLY

BACKGROUND AND SUMMARY

The invention relates to a floor assembly for a motor vehicle, with a front chassis module and a rear chassis module, and with a housing of an electrical energy store. The housing is arranged between the chassis modules as viewed in the longitudinal direction of the floor assembly. Furthermore, the invention relates to a motor vehicle with a floor assembly of this type, and to a method for producing a floor assembly.

DE 10 2018 204 680 A1 describes a vehicle with a vehicle body and an electrical energy store which is fastened to the vehicle body. The electrical energy store is arranged between a front axle carrier and a rear axle carrier of the vehicle.

An electrical energy store in a motor vehicle can be configured, in particular, as a high voltage store if the motor vehicle is configured as an electric vehicle or hybrid vehicle. A chassis module, for instance in the form of a front axle carrier, a housing of the high voltage store and a further chassis module, for instance in the form of a rear axle carrier, usually adjoin one another in the motor vehicle. Here, chassis modules such as the front axle carrier and the rear axle carrier frequently in each case have a comparatively complex geometry. Therefore, components of this type of a chassis of the motor vehicle are configured, for example, in a multiple-piece sheet metal design or in a cast design.

In contrast, the housing of the high voltage store is frequently constructed from simple profiles and metal sheets. This does not apply, however, to terminations or terminating components of the high voltage store which face the respective axle carrier or chassis module. Rather, there are likewise frequently more complex geometries in the region of these terminating components, which geometries entail a more complicated method of construction in the case of the production of these terminating components. The housing of the high voltage store is fixed via the terminating components, for example, on a floor panel of the motor vehicle.

The construction depicted above is not optimum in several aspects. This is because there is no separation of the complexity during the manufacture of the components under consideration of the floor assembly, namely of the components in the form of the chassis modules and the housing of the electrical energy store. Furthermore, it is associated with increased costs if both the chassis modules and the housing of the electrical energy store have constituent parts which are complicated to manufacture. Moreover, this construction is disadvantageous with regard to an optimization of topology and an optimization of structure. In addition, this construction is associated with an increased weight of the motor vehicle and occupation of a comparatively large amount of installation space.

It is an object of the invention to provide a floor assembly of the type mentioned at the outset, by means of which floor assembly less expensive manufacturing can be achieved, and to specify a motor vehicle with a floor assembly of this type and a corresponding method for producing a floor assembly of this type.

According to the invention, this object is achieved by way of a floor assembly, a motor vehicle, and a method for producing the floor assembly, in accordance with the independent claims. Advantageous embodiments of the invention are the subject matter of the dependent patent claims and of the description.

A floor assembly according to the invention for a motor vehicle comprises a front chassis module, in particular in the form of a front axle carrier, a rear chassis module, in particular in the form of a rear axle carrier, and a housing of an electrical energy store. The housing is arranged between the chassis modules as viewed in the longitudinal direction of the floor assembly. The floor assembly comprises at least one terminating component, via which the housing of the electrical energy store can be fixed on a vehicle body component of the motor vehicle. Here, the at least one terminating component is configured as a constituent part of at least one of the chassis modules.

This is based on the finding that a complexity of the geometries of the components under consideration of the floor assembly, namely of the chassis modules which are configured, in particular, as axle carriers and of the housing of the electrical energy store, can be separated in this way. This is because the terminating components which are usually constituent parts of the electrical energy store and serve to attach the housing of the electrical energy store to the vehicle body component of the motor vehicle frequently have a complex geometry. Accordingly, these terminating components are comparatively complicated to manufacture. For example, the terminating components can be configured as multiple-piece sheet metal components or as cast components. In addition, the chassis modules usually also have a comparatively high complexity with regard to the geometry, and are likewise comparatively complicated to manufacture.

In the present case, the at least one terminating component is then configured as a constituent part of at least one of the chassis modules, in particular of one of the axle carriers. This is advantageous in so far as, as a result, the components which are complex in terms of the geometry and/or are complicated in terms of manufacture are provided on at least one of the chassis modules. In contrast, a component which is simple in terms of the complexity is then present in the central part of the assembly, that is to say in the region of the housing of the electrical energy store. This entails it also being possible for the housing of the electrical energy store to also be replaced or exchanged in a modular manner, precisely because of the simple complexity, and it also being possible for this housing to be modified easily. This is advantageous, for example, when maintenance or repair of the electrical energy store is to be performed, or when the electrical energy store is to be exchanged.

In the present case, accordingly, the complexity of the construction of the floor assembly is separated with regard to its components. The housing, simple with regard to the overall design, of the electrical energy store adjoins the respective chassis modules here, and the complex geometries of at least one of the terminating components are shifted to the at least one chassis module, in particular to the at least one axle carrier.

On account of this separation of complex and simple geometries within the area under consideration, cost savings can be achieved, in particular, on account of inexpensive manufacture. This is because a manufacturer manufacturing merely the housing of the electrical energy store then needs less competence and needs to involve less complexity to manufacture the housing of the electrical energy store than would be the case if the at least one terminating component were a constituent part of the housing of the electrical energy store. In contrast, a manufacturer manufacturing the at least one chassis module, in particular the at least one axle carrier, can draw on their competence in the manufacture of complex components if both the chassis module, in particular the axle carrier, and the terminating component are manufactured as one module by way of this manufacturer.

In this way, a procurement policy of a company concerned with manufacturing motor vehicles can also be optimized. This is because a first supplier can thus be selected for supplying complex components and a second supplier can be selected for supplying simple components.

Furthermore, an optimization of installation space and an optimization of structure across different modules can be achieved. The latter is due to module boundaries being redefined by way of the assignment of the terminating component to the at least one chassis module.

Furthermore, an optimization of the topology can be achieved. This is because the chassis modules, in particular the axle carriers, which comprise the terminating components, can be optimized with regard to the introduction of force, and can in the process particularly satisfactorily exploit the available installation space with consideration of the material or materials used for this component.

Moreover, structural duplications can be avoided, as can occur in the case of a multiple-piece sheet metal design on account of a connection of metal sheets which are arranged above one another. This once again saves costs and weight.

In addition, an integration of functions can be achieved. This is because the complex components of the floor assembly which comprise the chassis module with the terminating component can provide a multiplicity of functions, for instance in order to connect the component to other components, in order to stiffen the component, and the like. In particular, functions of this type can be integrated by way of bolts, threads and the like into a module which comprises, for instance, the at least one axle carrier with the terminating component.

In the case of the manufacture of the at least one chassis module, in particular of the at least one axle carrier, which comprises at least one terminating part, integrating manufacturing methods such as a casting method or pressing method can be used, it being possible for different materials to be used. For example, metal can be used, in particular, in the form of aluminum and/or steel. In addition or as an alternative, it is possible for at least one plastic to be used, for instance in the form of a thermoplastic and/or a thermoset. Moreover, a multiple-piece, joined sheet metal design is possible for providing the module which comprises, for instance, the at least one axle carrier and the at least one terminating component. The module of the floor assembly which comprises, for example, the at least one axle carrier and the at least one terminating component can likewise be configured as a cast part.

In contrast to a floor assembly, in the case of which the terminating components are configured as constituent parts of the housing of the electrical energy store, three formerly different parts or modules with respective complex and less complex geometries therefore then become three modules or components, of which the housing, arranged in the middle, of the electrical energy store preferably has a very simple geometry. In this way, a separation of the complexity is achieved or can be achieved.

The floor assembly preferably comprises at least one first terminating component and one rear terminating component. As a result, both a front region of the housing and a rear region of the housing of the electrical energy store can be fixed on the vehicle body component of the motor vehicle. This is conducive to satisfactory mounting of the electrical energy store in the motor vehicle.

The front terminating component is preferably configured as a constituent part of the front chassis module. This is because the complexity of the front terminating component is integrated into the front chassis module which is complex in any case.

It has been shown to be advantageous, furthermore, if the rear terminating component is configured as a constituent part of the rear chassis module. In this way, the complexity of the rear terminating component is integrated into the rear chassis module which is complex in any case.

The housing of the electrical energy store preferably comprises a mounting pan for receiving a plurality of energy storage modules of the electrical energy store. Here, at least one wall of the mounting pan is fixed on the terminating component of at least one of the chassis modules. Fixing of the housing of the electrical energy store on the vehicle body component of the motor vehicle can thus be achieved in a very simple way via the terminating components.

In particular, a front wall of the mounting pan can be fixed on the terminating component of the front chassis module, and/or a rear wall of the mounting pan can be fixed on the terminating component of the rear chassis module. In this way, very secure fixing of the housing of the electrical energy store on the vehicle body component of the motor vehicle can be achieved.

The connection of the at least one wall of the mounting pan to the terminating component can take place in an integrally joined manner, for example by way of adhesive bonding or welding.

It can also be provided, however, that a connection of the at least one wall of the mounting pan to the terminating component can be released non-destructively. For example, the wall of the mounting pan can be screwed to the respective terminating component. A replacement of the housing of the electrical energy store can then be achieved in a particularly simple way.

Depending on their complexity, constituent parts of the electrical energy store, such as for instance electronic power elements and/or control devices or control modules, can be accommodated in the region of the housing of the electrical energy store and/or in the region of the at least one terminating component. If, in particular, components of this type of the electrical energy store have a relatively high complexity, it can be advantageous for these components to be arranged on the terminating component.

Therefore, at least one electronic power element of the electrical energy store and/or at least one control device of the electrical energy store can preferably be arranged on the at least one terminating component.

The motor vehicle according to the invention has a floor assembly according to the invention. In particular, the vehicle body component of the motor vehicle can be configured as a floor panel of the motor vehicle. This is because fixing of the housing of the electrical energy store on the floor panel between the front chassis module and the rear chassis module is advantageous.

In the case of the method according to the invention for producing a floor assembly of a motor vehicle, a front chassis module, in particular a front axle carrier, and a rear chassis module, in particular a rear axle carrier, are provided. A housing of an electrical energy store is arranged between the chassis modules as viewed in the longitudinal direction of the floor assembly. At least one terminating component of the floor assembly is provided which is configured as a constituent part of at least one of the chassis modules. The housing of the electrical energy store is connected via the at least one terminating component to a vehicle body component of the motor vehicle. Particularly inexpensive manufacturing of the floor assembly can be achieved by way of the configuration of the at least one terminating component as a constituent part of at least one of the chassis modules.

The preferred embodiments and advantages described for the floor assembly according to the invention and the motor vehicle according to the invention also apply to the method according to the invention, and vice versa.

Further features of the invention result from the claims, the figures and the description of the figures. The features and combinations of features mentioned above in the description and the features and combinations of features mentioned in the following text in the description of the figures and/or shown solely in the figures can be used not only in the respective specified combination, but rather also in other combinations or on their own.

The invention will now be described in greater detail on the basis of one preferred exemplary embodiment and with reference to the drawings.

BRIEF DESCRIPTION OF THE DRAWINGS

FIG. 2 diagrammatically shows the different modules or components of the floor assembly in a state, in which they are not connected to one another.

DETAILED DESCRIPTION OF THE DRAWINGS

Figure 1:
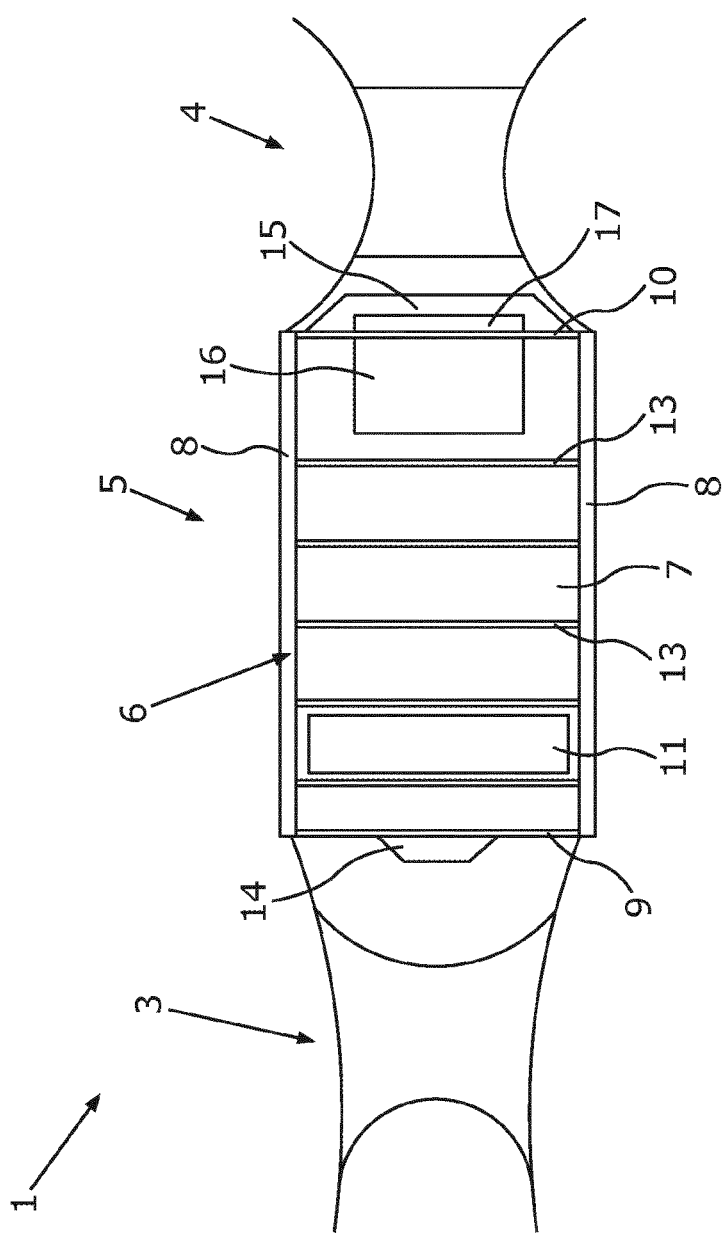
FIG. 1 is a diagrammatic illustration of a floor assembly of a motor vehicle, which floor assembly comprises a front chassis module in the form of a front axle carrier, a rear chassis module in the form of a rear axle carrier, and a housing, arranged in between, of an electrical energy store.
Figure 3:
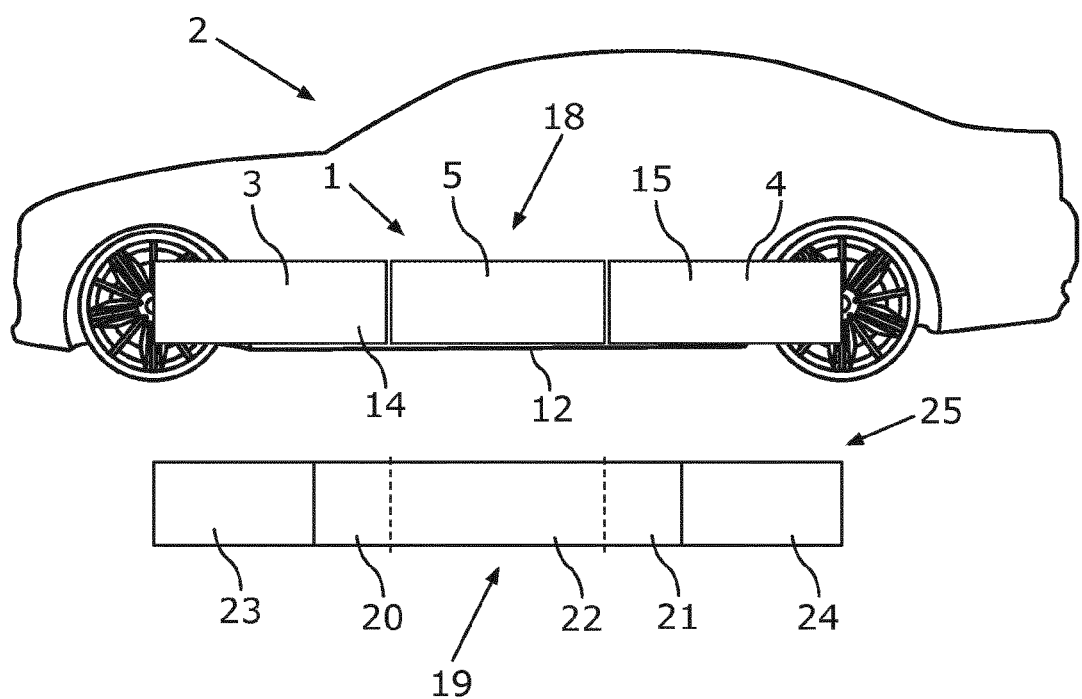
FIG. 3 diagrammatically shows a motor vehicle with the floor assembly according to FIG. 1.

FIG. 1 highly diagrammatically shows a floor assembly 1 of a motor vehicle 2 which is likewise shown merely diagrammatically in FIG. 3. The floor assembly 1 comprises a front chassis module, for instance in the form of a front axle carrier 3, a rear chassis module, for instance in the form of a rear axle carrier 4, and an electrical energy store 18 which is arranged between the two chassis modules or axle carriers 3, 4 (cf. FIG. 3).

Of the electrical energy store 18, FIG. 1 shows merely components or parts of a housing 5 of the electrical energy store 18. For example, the housing 5 can comprise a mounting pan 6 which has a floor 7. Furthermore, the mounting pan 6 has two longitudinal beams 8, a front end-side wall 9 and a rear end-side wall 10. A plurality of energy storage modules 11 of the electrical energy store 18 can be arranged in a mounting space, delimited by way of the floor 7, the walls 9, 10 and the longitudinal beams 8, of the mounting pan 6, of which energy storage modules 11 merely one is shown diagrammatically. Individual compartments for accommodating a respective energy storage module 11 or a plurality of energy storage modules 11 in the mounting space can be delimited from one another within the mounting pan 6 by way of transverse struts 13.

In a manner which is known per se, the energy storage modules 11 comprise a plurality of battery cells which are connected electrically in parallel and/or in series. The electrical energy store 18 can thus be configured, in particular, as a high voltage store, that is to say as an electrical energy store 18 which is capable of providing a rated voltage of more than 60 volts and, in particular, of several hundred volts.

The housing 5 of the electrical energy store 18 usually has terminating components which serve to connect the housing 5 to a vehicle body component, for instance in the form of a floor panel 12 of the motor vehicle 2 (cf. FIG. 3). These terminating components are, however, of relatively complex three-dimensional design as a rule and more complicated to manufacture than, for example, the mounting pan 6. For example, the housing 5 can be constructed from simple profile parts and metal sheets, and the receiving pan 6 can have the substantially cuboid design which is shown diagrammatically in FIG. 1.

In the present case, a front terminating component 14 and a rear terminating component 15 are not configured as constituent parts of the electrical energy store 18. Rather, the front terminating component 14 is configured as a constituent part of the front axle carrier 3. In contrast, the rear terminating component 15 is configured as a constituent part of the rear axle carrier 4.

In the present case, the axle carriers 14, 15 have a more complex geometry or design than the housing 5 of the electrical energy store 18. The diagrammatic top view in FIG. 1 therefore shows the terminating components 14, 15 in a polygonal manner, in particular in a manner of trapezoids. A separation of the complexity in the construction of the floor assembly 1 is achieved by way of the shifting of the complex geometries of the terminating components 14, 15 to the respective axle carriers 3, 4. Here, in particular, the housing 5 of the electrical energy store 18 has a particularly simple overall design.

The modular manufacture of the components of the floor assembly 1 in the form of the front axle carrier 3 together with the front terminating component 14 and of the rear axle carrier 4 with the rear terminating component 15 can be seen particularly clearly from FIG. 2. Accordingly, the middle module of the floor assembly 1, namely the housing 5 of the electrical energy store 18, has a considerably simpler construction than the axle carriers 3, 4 with their respective terminating components 14, 15.

In order to achieve the fixing of the electrical energy store 18 on the vehicle body component, for instance in the form of the floor panel 12 of the motor vehicle 2 (cf. FIG. 3), the front wall 9 of the mounting pan 6 can be connected, for example, to the front terminating component 14, for instance by way of adhesive bonding and/or welding and/or screwing. In an analogous way, the rear wall 10 of the mounting pan 6 can be connected to the rear terminating component 15.

Furthermore, in particular, a connection of at least one component of the floor assembly 1 to a side sill of the vehicle body of the motor vehicle 2 can be provided.

FIG. 1 and FIG. 2 show highly diagrammatic possible further components of the electrical energy store 18, for instance in the form of an electronic power system 16 and a control module 17. Electronic power elements or control devices of this type of the electrical energy store 18 can likewise be of differently complex configuration in terms of their construction and/or their geometry.

In the case of a high complexity of components of this type, they are preferably arranged in the region of at least one of the terminating components 14, 15. It can be seen by way of example from FIG. 2 that the control module 17 is arranged in the region of the terminating component 15. In contrast, the electronic power system 16 which is of less complex construction in the present case is arranged in the region of the housing 5 of the electrical energy store 18.

FIG. 3 diagrammatically shows how the floor assembly 1 which comprises the electrical energy store 18, the housing 5 of which is arranged between the front axle carrier 3 and the rear axle carrier 4, is arranged in the motor vehicle 2. Here, the joint configuration of the terminating components 14, 15 with the respective axle carrier 3, 4 is shown diagrammatically.

In contrast, a further illustration in FIG. 3 illustrates that an electrical energy store 19 for a motor vehicle can usually have terminating components 20, 21 which have a more complex geometry in comparison with a central region 22 of the electrical energy store 19. If an electrical energy store 19 of this type is arranged between a front axle carrier 23 with a complex geometry and a rear axle carrier 24 of the motor vehicle which likewise has a complex geometry, there is specifically no separation of the complexity of different components of a floor assembly 25, provided in this way, of the motor vehicle.

A separation of the complexity is achieved, in contrast, in the case of the motor vehicle 2 which is shown by way of example and diagrammatically in FIG. 3 in the present case with the floor assembly 1 according to FIG. 1.

Overall, the examples show how advantageous manufacturing of the floor assembly 1 can be achieved by way of a chassis integration into high voltage storage components.

LIST OF DESIGNATIONS

1 Floor assembly
2 Motor vehicle
3 Axle carrier
4 Axle carrier
5 Housing
6 Mounting pan
7 Floor
8 Longitudinal beam
9 Wall
10 Wall
11 Energy storage module
12 Floor panel
13 Transverse strut
14 Terminating component
15 Terminating component
16 Electronic power system
17 Control module
18 Electrical energy store
19 Electrical energy store
20 Terminating component
21 Terminating component
22 Central region
23 Axle carrier
24 Axle carrier
25 Floor assembly

What is claimed is:

1. A floor assembly for a motor vehicle, comprising:
a front chassis module and a rear chassis module; and
a housing of an electrical energy store which is arranged between the front and rear chassis modules as viewed in a longitudinal direction of the floor assembly, wherein
the floor assembly comprises at least one terminating component, via which the housing of the electrical energy store is fixable on a vehicle body component of the motor vehicle, and
the at least one terminating component is configured as a constituent part of at least one of the front or rear chassis modules;
wherein the at least one terminating component and at least one of the front or rear chassis modules are configured as a cast part, a pressed part, or a multi-piece, joined sheet metal part.

2. The floor assembly according to claim 1, wherein
the floor assembly comprises at least one front terminating component and one rear terminating component.

3. The floor assembly according to claim 2, wherein
the front terminating component is configured as a constituent part of the front chassis module.

4. The floor assembly according to claim 3, wherein
the rear terminating component is configured as a constituent part of the rear chassis module.

5. The floor assembly according to claim 2, wherein
the rear terminating component is configured as a constituent part of the rear chassis module.

6. The floor assembly according to claim 1, wherein
the housing of the electrical energy store comprises a mounting pan for receiving a plurality of energy storage modules of the electrical energy store, at least one wall of the mounting pan being fixed on the terminating component of at least one of the chassis modules.

7. The floor assembly according to claim 6, wherein
a front wall of the mounting pan is fixed on the terminating component of the front chassis module, and/or
a rear wall of the mounting pan is fixed on the terminating component of the rear chassis module.

8. The floor assembly according to claim 6, wherein
a connection of the at least one wall of the mounting pan to the terminating component is a non-destructively releasable connection.

9. The floor assembly according to claim 1, further comprising:
at least one electronic power element of the electrical energy store and/or at least one control device of the electrical energy store, wherein
the at least one electronic power element of the electrical energy store and/or the at least one control device of the electrical energy store is arranged on the at least one terminating component.

10. The floor assembly according to claim 1, wherein the at least one terminating component comprises a polygonal shape.

11. The floor assembly according to claim 10, wherein the at least one terminating component comprises a trapezoidal shape.

12. A motor vehicle, comprising:
a floor panel of the motor vehicle; and
a floor assembly for the motor vehicle, wherein the floor assembly comprises
a front chassis module and a rear chassis module; and
a housing of an electrical energy store which is arranged between the front and rear chassis modules as viewed in a longitudinal direction of the floor assembly, wherein
the floor assembly comprises at least one terminating component, via which the housing of the electrical energy store is fixable on a vehicle body component of the motor vehicle, and
the at least one terminating component is configured as a constituent part of at least one of the front or rear chassis modules;
wherein the at least one terminating component and at least one of the front or rear chassis modules are configured as a cast part, a pressed part, or a multi-piece, joined sheet metal part.

13. A method for producing a floor assembly of a motor vehicle, comprising:
   providing a front chassis module and a rear chassis module;
   arranging a housing of an electrical energy store between the chassis modules as viewed in the longitudinal direction of the floor assembly, wherein at least one terminating component of the floor assembly is provided which is configured as a constituent part of at least one of the chassis modules; and
   connecting the housing of the electrical energy store via the at least one terminating component to a vehicle body component of the motor vehicle;
   wherein the at least one terminating component and at least one of the front or rear chassis modules are configured as a cast part, a pressed part, or a multi-piece, joined sheet metal part.

* * * * *